United States Patent
Djavdan et al.

(10) Patent No.: US 6,328,940 B1
(45) Date of Patent: *Dec. 11, 2001

(54) PROCESS FOR PARTIAL OXIDATION OF A GAS STREAM CONTAINING HYDROGEN SULPHIDE

(75) Inventors: Ebrahim Djavdan, Paris; Jacques Koening, Versailles; Jean-François Nicolas, Le Plessis-Robinson; Vincent Queudot, Toul; Olivier Charon, Paris, all of (FR)

(73) Assignee: L'Air Liquide, Societe Anonyme pour l'Etude et l'Exploitation des Procedes Georges Claude, Paris (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/504,881

(22) Filed: Feb. 16, 2000

Related U.S. Application Data

(62) Division of application No. 08/894,441, filed as application No. PCT/FR96/00266 on Feb. 20, 1996, now Pat. No. 6,083,466.

(30) Foreign Application Priority Data

Feb. 21, 1995 (FR) .................................................. 95 01989

(51) Int. Cl.$^7$ ............................ C01B 17/00; C01B 17/16
(52) U.S. Cl. ................................ 423/224; 431/8; 431/187
(58) Field of Search ...................... 423/210, 220, 423/224, 235, 237, 573.1, 569; 431/2, 8, 10, 159, 181, 187; 110/345

(56) References Cited

U.S. PATENT DOCUMENTS

| | | |
|---|---|---|
| 3,860,697 | 1/1975 | Palm ..................................... 423/574 |
| 4,117,100 | 9/1978 | Hellmer et al. ....................... 423/569 |
| 4,394,119 | 7/1983 | Waller et al. ............................. 431/5 |
| 4,481,181 | 11/1984 | Norman ........................... 423/573 G |
| 4,501,725 | 2/1985 | Lell .................................. 423/573 G |
| 4,575,453 | 3/1986 | Reed .................................... 422/149 |
| 4,632,043 | 12/1986 | Pendergraft .......................... 110/345 |
| 4,632,819 | 12/1986 | Fischer et al. .................... 423/574 R |
| 4,797,087 | 1/1989 | Gitman .................................. 431/10 |
| 4,933,163 | 6/1990 | Fischer et al. .................... 423/574 R |
| 4,988,287 | 1/1991 | Stegelman et al. .................. 431/284 |
| 5,743,723 | 4/1998 | Iatrides et al. .......................... 431/8 |

FOREIGN PATENT DOCUMENTS

| | | |
|---|---|---|
| 3430015 | 5/1986 | (DE) . |
| 315225 | 10/1987 | (EP) . |
| 325286 | 1/1988 | (EP) ................................ 423/574 R |

*Primary Examiner*—Steven P. Griffin
*Assistant Examiner*—Eileen E. Nave
(74) *Attorney, Agent, or Firm*—Burns, Doane, Swecker & Mathis, L.L.P.

(57) ABSTRACT

Process for partial oxidation in a Claus furnace of at least one gas stream having hydrogen sulphide, and including the steps of: (a) injecting at least one gas stream including hydrogen sulphide and at least one oxygen-enriched gas stream into the Claus furnace, wherein each of the streams is injected at a speed of injection which is substantially parallel, and (b) controlling the speed of injection of the gas stream including hydrogen sulphide and the speed of injection of the oxygen-enriched gas stream such that the speeds have a ratio between 0.8 and 1.2.

1 Claim, 4 Drawing Sheets

PROCESS FOR PARTIAL OXIDATION OF A GAS STREAM CONTAINING HYDROGEN SULPHIDE This application is a continuation, divisional, of Application No. 08/894,441, filed Nov. 17, 1997, now U.S. Pat. No. 6,083,466, which is a §371 of PCT Application No. PCT/FR96/00266, filed Feb. 20, 1996.

BACKGROUND OF THE INVENTION (i) Field of the Invention

The present invention relates to a process for partial oxidation, in a Claus furnace, of a gas stream containing hydrogen sulphide, by reaction with a stream of a gas such as oxygen-enriched air.

(ii) Description of Related Art

Hydrogen sulphide-rich gas streams are wastes produced by many industries, especially the oil refining industry and the production of natural gas. For reasons connected especially with the environment, these hydrogen sulphide-rich gases cannot be released as such into the atmosphere. It is therefore necessary to treat them with a view to appreciably reducing their hydrogen sulphide content. A well-known process for treating these hydrogen sulphide-rich gases is the Claus process.

This process includes a thermal part and a catalytic part. In the thermal part two main reactions are carried out. The first reaction consists in reacting approximately a third of the hydrogen sulphide to be treated with oxygen, to produce water and sulphur dioxide according to the following reaction:

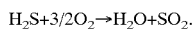

$$H_2S + 3/2 O_2 \rightarrow H_2O + SO_2.$$

The remaining ⅔ of the hydrogen sulphide to be treated are reacted with the sulphur dioxide formed during the above first stage, according to the following reaction:

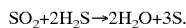

$$SO_2 + 2H_2S \rightarrow 2H_2O + 3S.$$

The first reaction is usually carried out with atmospheric oxygen. In order to increase the production efficiency of the thermal part of the Claus process it has already been proposed to react, during the said first stage, hydrogen sulphide with oxygen-enriched air. However, it is generally considered that this enrichment of air with oxygen must not exceed a certain threshold because otherwise the heat of the reaction is such that the temperature at the walls of the Claus furnace exceeds the temperature which can be withstood by the refractories forming part of these walls. In his respect reference may be made to Patent Application EP-A-165,609, which describes that, if a gas stream containing 90 mol % of hydrogen sulphide is reacted with a gas stream containing 40 mol % of oxygen, the theoretical flame temperature, calculated in the adiabatic conditions, should reach approximately 1732° C. In the same conditions, but with a gas stream containing 70 mol % of oxygen, it is indicated that the flame temperature should reach approximately 2065° C. The refractories which give the highest performance are described in this document as not capable of withstanding temperatures higher than approximately 1537° C. In Patent Application EP-A-165,609 it has been considered that the treatment of a hydrogen sulphide-rich gas stream with a stream of air enriched with oxygen to 30–32% could not be carried out in a conventional Claus furnace, that is to say a Claus furnace sized to operate with air not enriched in oxygen. A process has therefore been proposed according to which the effluents originating from the reactions which have taken place in the furnace are cooled. After the sulphur formed during the said reactions has been condensed and extracted, a portion of the cooled effluents is recycled into the reaction zone of the furnace in order to lower the temperature of this reaction zone. Such a process allows a treatment of hydrogen sulphide with highly oxygen-enriched air. However, it has the disadvantage of requiring the use of recycling equipment to be added to a conventional Claus furnace; this process cannot therefore be carried out by means of a conventional Claus furnace.

Another process for treating hydrogen sulphide-rich gas with a stream of oxygen-enriched gas has been described in Patent Application EP-A-237,217. This process consists in partially oxidizing the hydrogen sulphide with pure oxygen or with highly oxygen-enriched air in two stages carried out in two different combustion zones, each separated by a cooling zone.

This process permits staging of the heat of reaction between the two zones. However, it has the disadvantage of requiring the addition of a second Claus furnace, and this results in a considerable capital cost. This process, too, cannot therefore be implemented by means of a conventional Claus furnace.

From EP-A-315 225 it is also known to inject oxygen, hydrogen sulphide and air into a Claus furnace burner, from the centre outwards. The speed of injection of oxygen is between 50 and 250 m/s, whereas hydrogen sulphide is injected at a speed of between 10 and 30 m/s, which represents a ratio of oxygen/hydrogen sulphide speeds of between 25 and 1.7.

SUMMARY OF THE INVENTION

The present invention relates to a process for partial oxidation of a gas containing hydrogen sulphide with a stream of oxygen-enriched gas, which can be carried out in a conventional Claus furnace. This process therefore does not require the addition of a second Claus furnace, nor does it require the injection of cooled and recycled reaction effluents with a view to lowering the temperature of the reaction mixture.

The subject-matter of the present invention is therefore a process for partial oxidation of at least one gas stream containing hydrogen sulphide in a Claus furnace, characterized in that the following stages are carried out:

(a) at least one gas stream containing hydrogen sulphide and at least one oxygen-enriched gas stream are injected into the Claus furnace, the speeds of injection of each of these streams being substantially parallel, (b) the speed of injection of the oxygen-enriched gas stream and the speed of injection of the gas stream containing hydrogen sulphide are controlled such that the ratio of the said speeds is between 0.8 and 1.2, (c) the oxygen in the oxygen-enriched gas stream is reacted with the hydrogen sulphide, (d) a gas stream depleted in hydrogen sulphide is obtained at the exit of the Claus furnace. This gas stream thus obtained is enriched in sulphur.

Oxygen will preferably be injected at the center, surrounded by an oxygen-enriched air stream, itself surrounded by a hydrogen sulphide stream. Also preferably, when only two gas streams are injected into the furnace, the oxygen-enriched gas (or pure oxygen) is injected in the center, coaxially, and the hydrogen sulphide at the periphery. Oxygen-enriched gas is intended to mean a gas containing more than 21 mol % of oxygen, preferably more than 25 mol %, and very preferably between 40 and 100 mol %.

The invention is described with regard to the detailed description below and the figures.

DETAILED DESCRIPTION OF PREFERRED EMBODIMENTS

Figure 1:
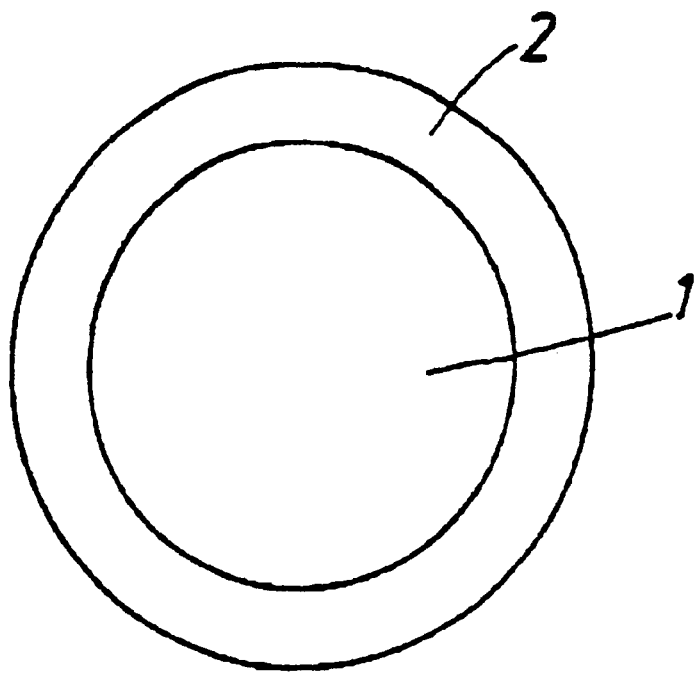
FIG. 1 shows a cross-section of a twin-tube burner for the use of an embodiment of the process of the invention.

It has been found by the Applicant Company that the use of the process of the invention permits, surprisingly, the partial oxidation of the hydrogen sulphide present in a gas stream with a gas stream which is enriched in oxygen, or even very enriched in oxygen, this being in a conventional Claus furnace. In fact, the only modification of the conventional Claus furnace required with a view to the use of the process of the invention consists of a simple adaptation of the burners and/or of the injectors for the injection of the various streams, so as to permit operation with an oxygen-enriched gas. These burners and/or injectors are generally placed at the bottom of the furnace. However, no modification is required especially insofar as the dimensions and the structure of the Claus furnace itself are concerned. Unexpectedly, and contrary to what the prior art led to expect, the use of the process of the invention makes it possible to obtain temperatures at the walls of the furnace which are lower than the temperatures that can be withstood by the refractories forming part of the said walls, this being so even when the Claus furnace is of the conventional type.

The ratio of the speeds of injection into the Claus furnace of the gas stream containing hydrogen sulphide to the speed of injection of the oxygen-enriched gas stream is usually between 0.8 and 1.2. In fact, one of the characteristics of the invention is producing pulses close to the outlet of the burner, that is to say, bearing in mind the densities of the gases concerned, similar speeds of injection of oxidizing agent and of fuel, so as to slow down and to distribute over a longer path the turbulence created by shear between the sour gases ($H_2S$, and the like) and the optionally oxygen-enriched air (air +$O_2$ or pure $O_2$). The more quickly the turbulence is obtained and concentrated locally, the more the oxidation reactions will be facilitated, and the more the "hot core" will be concentrated and near the burner and will transfer heat to the nozzle of the burner and to the walls of refractories at the head of the furnace. Conversely, if the turbulence is not produced rapidly or concentrated locally, according to the invention, the oxidation reactions are not facilitated; the nozzle of the burner is less hot and less heat is transferred to the refractory walls of the furnace (which makes it possible to employ less costly refractories). The term parallel speeds means, in the context of the present invention, that the angle formed by the speed vectors of each of the said streams, taken immediately as they emerge from the burners and/or the injectors, is smaller than approximately 150°.

The gas stream can be enriched in oxygen to a content higher than 25 mol %, preferably to a content of between 40 and 100 mol %. The oxygen content to which the gas is enriched in oxygen corresponds to the molar fraction of oxygen in the enriched gas. To give an example, air enriched in oxygen to 50% consists of a gaseous mixture containing 50 mol % of oxygen. The gas which is enriched in oxygen is usually air. If appropriate, this gas can be enriched in oxygen to 100%, in which case it consists of pure oxygen.

The hydrogen sulphide concentration in the gas stream can be higher than or equal to 10 mol %, more generally between 40 and 99 mol %.

The gas stream containing hydrogen sulphide may consist of a sour gas stream or an ammonia-containing gas stream.

A sour gas consists essentially of hydrogen sulphide and of at least one of the following compounds: water vapour, carbon dioxide, hydrocarbons and other sulphur compounds. The hydrogen sulphide content of the sour gas may be between 60 and 95%.

An ammonia-containing gas usually consists of 10 to 60 mol % of water vapour, from 10 to 60 mol % of hydrogen sulphide and from 10 to 60 mol % of ammonia.

The gas stream containing hydrogen sulphide and the oxygen-enriched gas stream are injected into the furnace in such a way that the streams come into contact and permit the reaction of partial oxidation of hydrogen sulphide with oxygen. For this purpose the streams are injected in proximity to one another.

When the gas stream containing hydrogen sulphide is a sour gas stream. The procedure is preferably such that at least a portion of the sour gas stream surrounds the oxygen-enriched gas stream. The configuration according to the invention preferably always comprises the reducing gas outside (sour gas); this arrangement decreases the area of contact of the sour gas with the oxidizing agent since the sour gas "covers" the oxygen and/or air, in contrast to the prior art, in which the sour gas is in contact with oxygen on one side and with air on the other. However, in the case where ammonia gas must be destroyed ($NE_3$ is also a reducing gas), the ammonia will be injected preferably at the center, so as to oxidize it completely and thus to destroy it completely, whereas hydrogen sulphide needs to be only partially destroyed.

The various streams can be injected by means of a burner comprising concentric tubes. Such a burner is shown in cross-section in FIG. 1, where tube 1 permits the injection of a stream of oxygen-enriched air and tube 2 permits the injection of the gas stream containing the hydrogen sulphide. Such a burner is more particularly suited to partial oxidation of a sour gas stream.

According to another aspect of the invention the oxygen-enriched gas stream may be composed of two distinct streams, the speeds of injection of each of these streams being substantially parallel; the oxygen content of each of these streams being substantially different. Thus one of these streams may consist of pure oxygen, the other stream being a stream of air or a stream of air enriched to 25–100% in oxygen. The stream of air or the oxygen-enriched air stream advantageously surrounds the stream of pure oxygen. The stream of gas containing hydrogen sulphide generally surrounds the stream of air or the stream of oxygen-enriched air. The injection of these various streams into the Claus furnace can be carried out by means of a burner with a number of concentric tubes. Such a burner is shown in cross-section in FIG. 2, where the central tube 3 permits the injection of oxygen, the intermediate tube 4 permits the injection of the stream of air or of the oxygen-enriched air stream, and the external tube 5 permits the injection of the gas stream containing hydrogen sulphide.

According to another aspect of the invention, when the oxygen-enriched gas stream is composed, as indicated above, of two distinct streams which have oxygen contents that differ appreciably, the procedure is such that the stream of ammonia-containing gas is surrounded by the stream of gas most highly enriched in oxygen, the latter itself being surrounded by the stream of gas least enriched in oxygen. The stream of gas most highly enriched in oxygen preferably consists of pure oxygen and the stream least enriched in oxygen is air. The injection of these various streams can be carried out by means of a multitube burner like that shown in cross-section in FIG. 3, where the central tube 6 permits the injection of the ammonia-containing gas, the first intermediate tube 7 permits the injection of a stream of pure oxygen, the second intermediate tube 8 permits the injection of the oxygen-enriched gas stream and the external tube 9 permits the injection of a sour gas stream.

According to yet another aspect, the process of the invention can be implemented by means of a number, for example 2 or 3, of the burners described above, placed in parallel. Thus, when the intention is to undertake the oxidation of a sour gas stream and of an ammonia-containing gas stream, two burners according to FIG. 1 can be employed. In the first of these burners the sour gas is injected by the tube 2 and the oxygen-enriched gas by the tube 1. In the second burner the ammonia-containing gas is injected by the tube 1 and the oxygen-enriched gas by the tube 2. The gas stream obtained at the exit of the furnace is generally at a temperature higher than 1000° C., preferably between 1300° C. and 2000° C.

Whichever is the implementation of the process of the invention, the burners used generally have a predetermined area section for each of their tubes.

This area must be such that, depending on the flow rates of each of the streams and on the enrichment in oxygen which is chosen, the ratios of speeds of, on the one hand, the oxygen-enriched gas stream(s) to, on the other hand, the gas stream(s) containing hydrogen sulphide are between 4/1 and 1/4; it being understood that contiguous streams must have between them speed ratios of between 0.8 and 1.2.

The flow rates of the streams are imposed by the plant in which the process of the invention is carried out. More particularly, the flow rates depend especially on the dimensions of the Claus furnace and on the characteristics of the heat exchanger placed at the exit of the Claus furnace.

Depending on these parameters, a person skilled in the art is perfectly capable of determining the areas.

According to a particularly advantageous aspect of the invention all the gas streams used are injected into the Claus furnace coaxially.

The process according to the invention can be carried out in a single Claus furnace, that is to say that it does not require the use of two Claus furnaces arranged in series. More particularly, it can be carried out in a conventional Claus furnace, that is to say a Claus furnace sized hitherto for operating with a partial oxidation of hydrogen sulphide which is carried out solely with air not enriched in oxygen; this being also without recycling of cooled reaction effluents.

The invention will be understood better in the light of the examples which follow:

EXAMPLE 1

Streams of air enriched with various proportions of oxygen and a sour gas stream consisting of 91% of hydrogen sulphide and 9% of water vapour are injected into a conventional Claus furnace equipped with a burner such as that shown in FIG. 1. The length of the Claus furnace is 8 m, its internal diameter 1.5 m and its external diameter 2 m.

Tube 1 of the burner permits the injection of pure oxygen. Tube 1 has a diameter of 0.22 m. Tube 2 permits the injection of the sour gas stream. Its diameter is 0.4 m. These two tubes are coaxial and therefore allow both of the streams to be injected with parallel speeds.

The speed of injection of the sour gas stream is 36 m/s.

The speed of injection of the pure oxygen stream is also 36 m/s.

The walls of the furnace include refractories comprising 99% of alumina capable of withstanding a temperature of 1800° C. Such refractories are marketed by the company Savoie Refractaires, under reference AL 100, and by the company Didier Werke, under reference Durital K 99.

Figure 4:
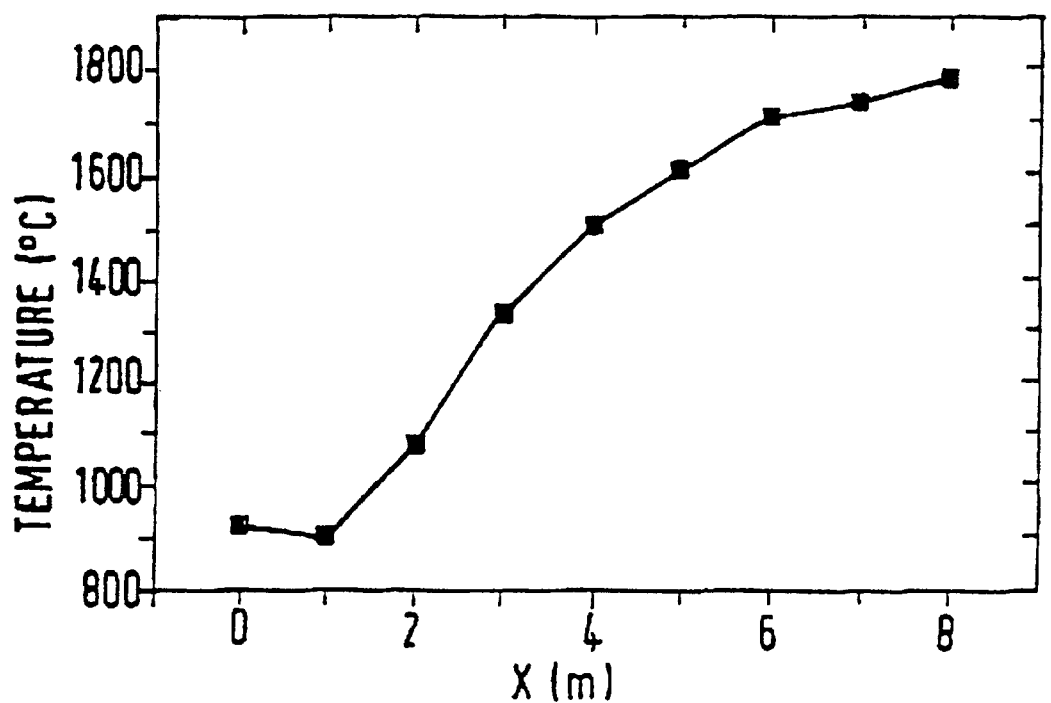
FIG. 4 shows the temperatures at the walls of a Claus furnace during the partial oxidation of a sour gas stream with a stream of pure oxygen.

The temperatures at the walls are determined over the whole length of the furnace. The results obtained are shown in FIG. 4, where X represents the length (in m) of the furnace. These results show that, when carried out in the conditions of the invention, the reaction by oxidation of a sour gas stream rich in hydrogen sulphide with a stream of pure oxygen can be carried out in a single conventional Claus furnace without recycling of cooled reaction effluents while temperatures which are acceptable to the refractories are maintained over the whole length of the furnace.

EXAMPLE 2

Figure 2:
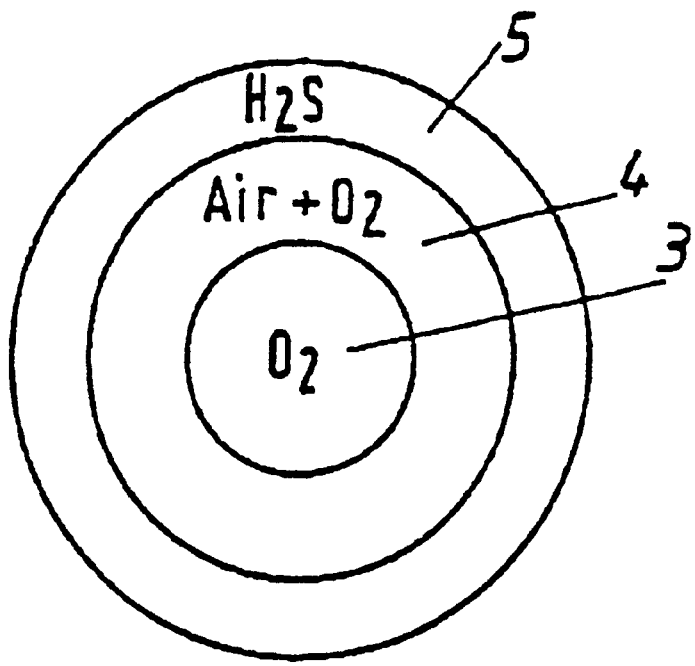
FIG. 2 shows a cross-section of a burner with three concentric tubes for the use of another embodiment of the process of the invention.

A Claus furnace identical with that of Example 1 is used, but equipped with a burner as shown in FIG. 2, to carry out the partial oxidation of a sour gas stream and of an ammonia-containing gas stream with a stream of pure oxygen.

The sour gas stream consists of 90 mol % of hydrogen sulphide and of 10 mol % of water vapour. This stream is injected by the tube 5 at a speed of 40 m/s at the outlet of the tube.

The ammonia-containing gas stream consists of 20 mol % of hydrogen sulphide, 50 mol % of water vapour and 30 mol % of ammonia. This stream is injected by the tube 3 at a speed of 40 m/s at the outlet of the tube.

The stream of pure oxygen is injected by the tube 4 at a speed of 49 m/s at the outlet of this tube.

The diameters of tubes 3, 4 and 5 are 0.1 m, 0.22 m and 0.40 m respectively.

The temperatures at the walls are determined over the whole length of the furnace.

Figure 5:
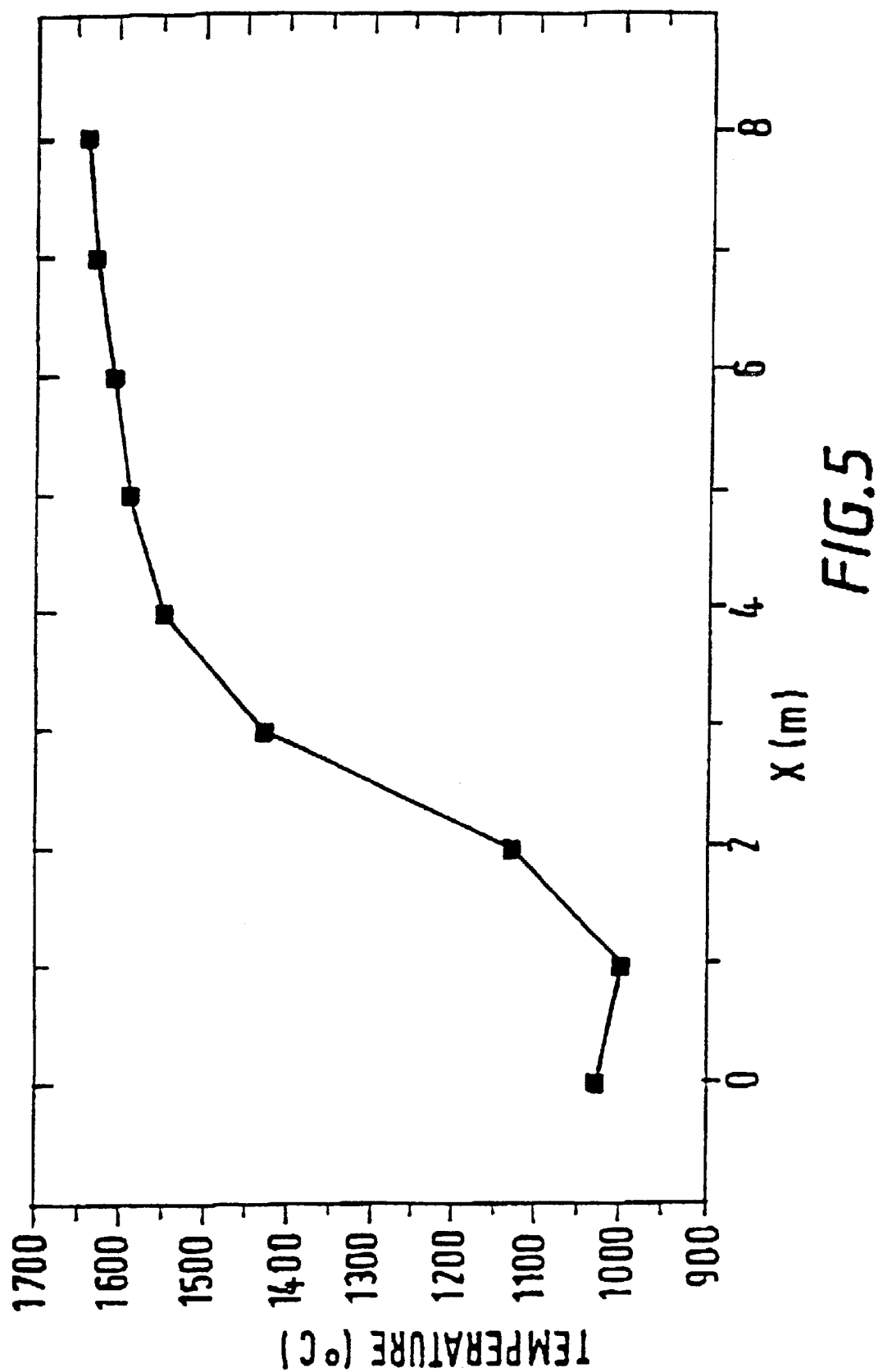
FIG. 5 shows the temperatures at the walls of a Claus furnace during the partial oxidation of a sour gas stream and of an ammonia-containing gas stream, with a stream of pure oxygen.

The results obtained are shown in FIG. 5, where X represents the length of the furnace (in m).

These results show that the oxidation of a sour gas stream rich in hydrogen sulphide and of an ammonia-containing gas stream with a stream of pure oxygen can be carried out in a conventional Claus furnace while temperatures which are acceptable to the refractories are maintained, this being over the whole length of the furnace.

EXAMPLE 3

By employing four different injection configurations which are detailed below (cases No. 1 to 4) in the same furnace, with injections of sour gas, air and oxygen (50 mol % of $O_2$ present in the sum of the two streams of air and oxygen), one of the advantages obtained by virtue of the invention is illustrated, that is to say the lowering of the temperature of the refractories in proximity to the burner. The various temperature curves obtained with the following four cases are shown with numbers from 1 to 4 respectively.

Figure 6:
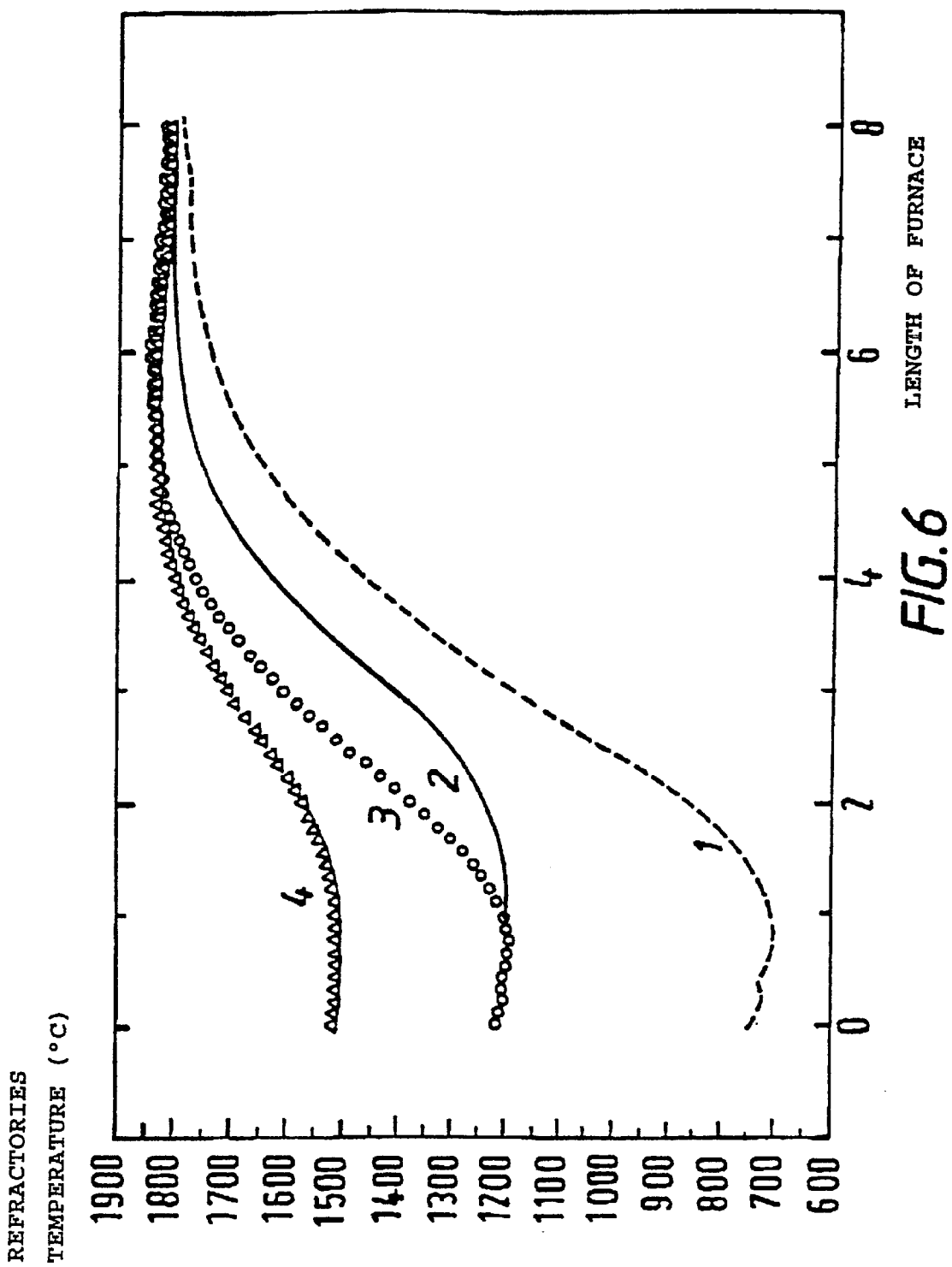
FIG. 6 shows comparative temperature curves in the context of Example 3.

Case No. 1:

The configuration described in FIG. 2 is employed. The central tube (oxygen injection) has a diameter of 16.7 cm and the speed of injection of oxygen is 30 m/s. This central tube is surrounded by a second tube, placed coaxially, of 27.6 cm diameter, in which air is injected at 30 m/s. A peripheral tube of 42.4 cm is placed coaxially with the first two, and the sour gas (hydrogen sulphide) is injected in this at 30 m/s. The results are represented by curve 1 in FIG. 6.

Case No. 2:

A configuration is employed comprising oxygen in the center, then the sour gas, then the air injected in the external tube, everything being otherwise the same as in Case No. 1, but with diameters of 16.7 cm, 36.2 cm and 42.4 cm respectively (oxygen, sour gas, air respectively), (same speeds). The results are shown on curve 2 in FIG. 6: the temperature of the refractories at the burner is much higher than in Case No. 1 (approximately 1200° C. instead of 700° C.), the temperatures becoming substantially equal at approximately 8 meters from the burner.

Case No. 3:

A configuration similar to that in Example 1 is employed, with the exception of the internal tube of 7.4 cm diameter with a speed of injection of oxygen in this tube of 150 m/s (instead of 30 m/s), a concentric tube of 23.2 cm diameter (air at a speed of 30 m/s) and a concentric external tube of 39.6 cm diameter (sour gas at a speed of 30 m/s). The results obtained are shown on curve No. 3. The results obtained are even less good than in Case No. 2 because the temperature of the refractories increases more rapidly as a function of the distance (which clearly shows a faster combustion because of the high turbulence created by the difference in the speeds as well), whereas in the structure of the invention the substantially similar speeds produce a delayed or stagewise combustion.

Case No. 4:

Everything being otherwise the same as in Case No. 1, the Claus burner comprises an internal tube of 7.4 cm diameter in which oxygen travels at 150 m/s, a second tube of 33 cm diameter placed coaxially and in which the sour gas travels (speed 30 m/s) and an external tube of 39.6 cm diameter (speed 30 m/s) for air injection. The results are shown on curve 4. They are representative of the technology of the prior art, as described, for example, in EP-A-315 225. The temperature in the neighbourhood of the burner changes from the single (700° C.—curve 1) to more than double (1500° C.—curve 4)

EXAMPLE 4

Figure 3:
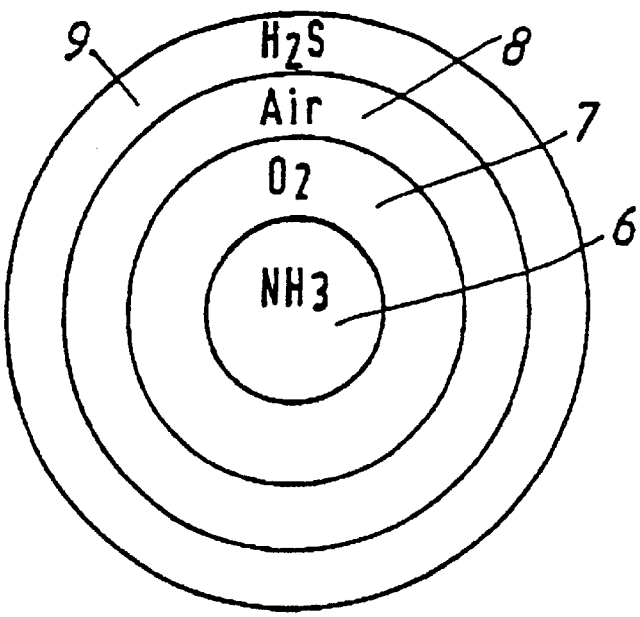
FIG. 3 shows a cross-section of a burner with four concentric tubes for the use of yet another embodiment of the process of the invention.

The configuration tested is that of FIG. 3, that is to say, the same arrangement as in FIG. 2 insofar as the concentric tubes injecting $O_2$/air/sour gas respectively are concerned, but a tube injecting ammonia-containing gas to be destroyed is placed at the center.

This is done with a view to destroying $NH_3$ preferably by oxidation in contact with oxygen, which is a fast and complete reaction, rather than by thermal dissociation, which is a slow and incomplete reaction and which would be used if the ammonia-containing gas were injected, for example, premixed with the sour gas.

In the same way as in Case No. 1 of Example 3, the injection speeds are similar.

In the two cases which follow, the flow rate of $NH_3$ injected is such that the equivalent stream composition of sour gas and of ammonia-containing gas is 70% $H_2S$, 7% $H_2O$, 23% $NH_3$; furthermore, the flow rate of pure $O_2$ injected is such that $O_2$ in the ($O_2$+air) stream is 50 mol %.

Case No. 1:

Diameter tube 6 ($NH_3$) of 17.6 cm, speed 30 m/s 7 ($O_2$) of 24.3 cm, speed 30 m/s 8 (air) of 32.8 cm, speed 30 m/s 9 (SG) of 42.4 cm, speed 30 m/s After analysis it is found that the $NH_3$ content after 6 m is substantially nil over the whole cross-section of the furnace.

Case No. 2:

The starting point is the configuration of FIG. 2, but the ammonia-containing gas is injected in tube 5 in addition to the sour gas.

Diameter tube 3 ($O_2$) of 16.7 cm, speed 30 m/s 4 (air) of 27.6 cm, speed 30 m/s 5 (sour gas+ammonia-containing gas) 42.4 cm, speed 30 m/s The $NH_3$ content after 8 m varies between 5% near the walls of the furnace and 0.5% on the axis of the furnace.

Thus, here too, the invention (Case No. 1) brings an unexpected advantage.

What is claimed is:

1. Process for partial oxidation in a Claus furnace of at least one gas stream comprising hydrogen sulphide, comprising the steps of:

(a) injecting at least one gas stream comprising hydrogen sulphide and at least one oxygen-enriched gas stream into the Claus furnace, wherein said streams are injected such that the angle formed by the speed vectors of each of the streams is smaller than approximately 15° when taken immediately after said streams emerge, (b) controlling the speed of injection of the gas stream comprising hydrogen sulphide and the speed of injection of the oxygen-enriched gas stream such that turbulence created by shearing of said gases is slowed down and distributed over a long path and not produced rapidly or concentrated locally, whereby less heat is transferred to refractory walls of said furnace, such that the furnace temperature is from 1000° C. to 1800° C.

* * * * *